March 10, 1936.  E. R. WHITNEY  2,033,797
TRIMMING TOOL
Filed July 15, 1932
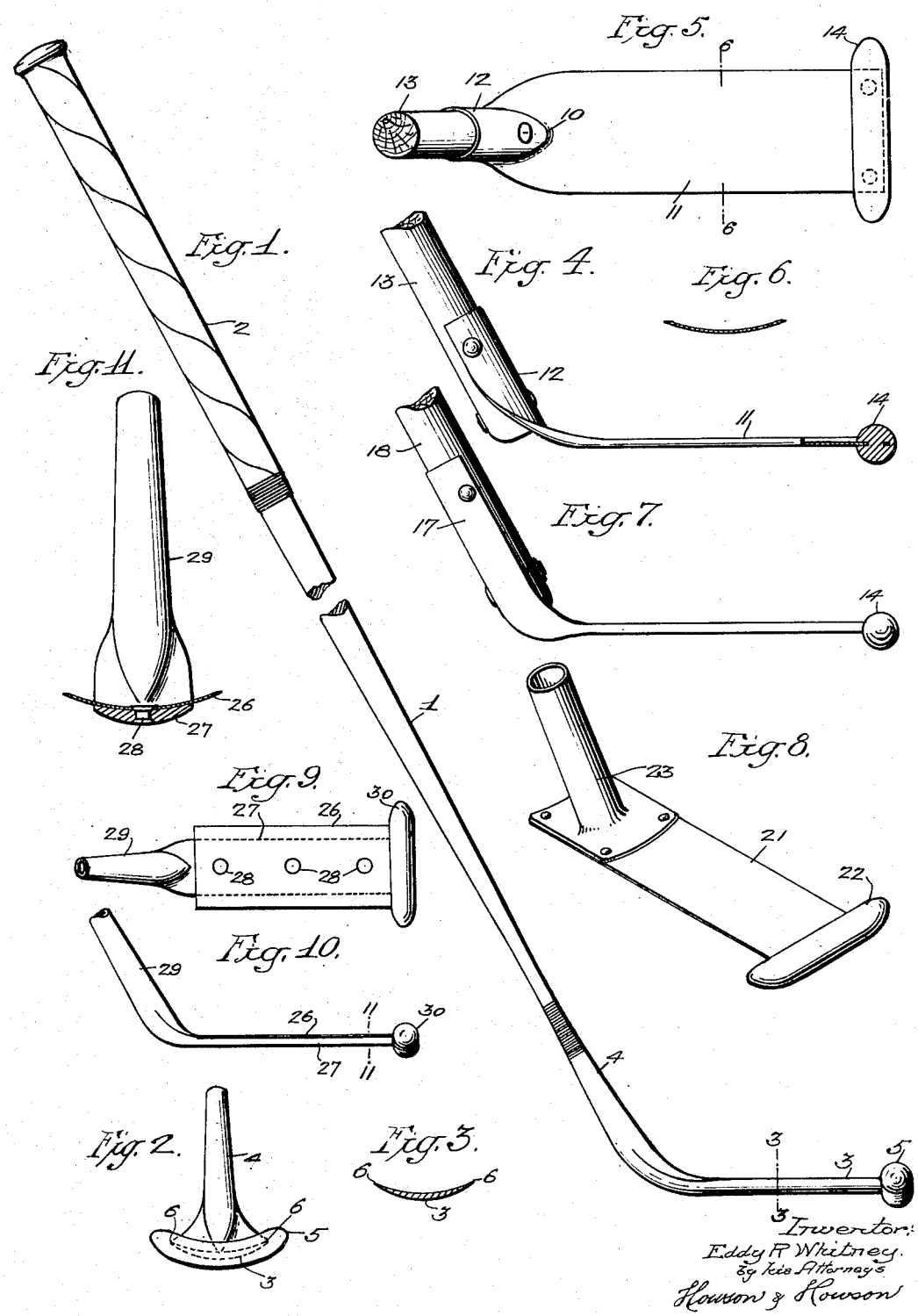
Inventor:
Eddy R Whitney.
By his Attorneys
Howson & Howson Patented Mar. 10, 1936

2,033,797

UNITED STATES PATENT OFFICE 2,033,797

TRIMMING TOOL

Eddy R. Whitney, Philadelphia, Pa.

Application July 15, 1932, Serial No. 622,810

2 Claims. (Cl. 30—9)

A principal object of this invention is to provide a combination instrument that may be useful both as a weed cutter or grass trimmer and as a golf-practice device.

Another object of the invention is to provide a weed-cutting or grass-trimming device so constructed as to inject into the work of cutting or trimming an element of sport which relieves the arduousness of the work and in effect disguises the work under simulation of play.

Still another object of the invention is to provide a weed or grass-trimming device which while in addition to constituting an efficient instrument for the intended purpose is so constructed as to closely simulate a golf-club, thereby affording a medium for golf-practice in the operation of the instrument for its primary purpose.

A still further object of the invention is to provide an implement of the stated character so constructed as to largely avoid danger of tearing the turf during the cutting operations.

The invention further resides in certain novel features and structural details hereinafter set forth and illustrated in the attached drawing, in which:

Figure 1 is a side view of an implement made in accordance with my invention;

Fig. 2 is a front end view of the head portion of the device;

Fig. 3 is a section on the line 3—3, Fig. 1;

Fig. 4 is a side elevation of the head portion of a modified form of implement;

Fig. 5 is a plan view of that portion of the device shown in Fig. 4;

Fig. 6 is a section on the line 6—6, Fig. 5;

Fig. 7 is a side elevational view illustrating another modification;

Fig. 8 is a view in perspective of a further embodiment of my invention;

Figs. 9 and 10 are respectively top plan and side views of a still further form of my device, and Fig. 11 is a section on the line 11—11, Fig. 10.

With reference to the drawing, my implement in a preferred embodiment takes substantially the form of a golf-club, with the exception that the head portion thereof is so formed as to render it efficient in the function of cutting weeds or grass. The embodiment shown in Figs. 1 to 3, inclusive, for example, comprises the usual tapered shaft 1 having at one end a leather or other grip portion 2, and having at the opposite end a working head 3 secured to the shaft in the usual manner. This working head consists in the illustrated embodiment of a forged or otherwise formed elongated body portion having at one end a hotel extension 4 for reception of the end of the shaft 1, and at the other end a weight 5. The body portion as shown in Fig. 3 is a concavo-convex section, the convex surface being the nether surface of the head, and the weight 5 in the present instance is similarly curved. The longitudinal edges 6 of the body portion constitute the cutting edges of the tool, and may be ground or otherwise sharpened so as to render them efficient in that function. Preferably the head portion is of a weight corresponding to the head of one of the golf-clubs, and the balance and weight of the entire club should correspond as closely as possible to the accepted golf-club standards.

The instrument is adapted to be used much after the manner of a golf-club when stroking the ball, only in the present instance the weed constitutes the object at which the stroke is aimed. The user addresses the weed as he would normally address a golf-ball, and may swing after the approved manner in cutting the weed. The accuracy with which he clips the weed as the desired point about the surface of the earth affords an indication of the accuracy and timing of his swing. The bottom surface of the head 3 of the instrument being convexed, as previously set forth, in line with the direction in which the head portion moves against the weed, there is a natural deflecting tendency in the event that the head comes in contact with the ground surface tending to prevent digging up of the turf or injury to the latter. The weight portion 5 functions not only to distribute the weight of the head properly with respect to the shaft, but has another function of importance in the weed or grass-cutting operation. The momentum of this weighted portion 5 tends to carry the blade through the weed or grass in the normal direction and prevents the outer end of the head portion from being deflected backwardly when the blade hits the stalk. An efficient cutting operation is thus insured. The weight also acts to protect the outer end of the cutting blade against damage and permits the implement being used with safety close against the side of a wall. The pointed ends of the weight also act with a wedge or plough effect to divide the grass at the outer end of the blade along a clearly defined straight line, insuring a clean-cut edge of good appearance. It will be apparent, as illustrated, that the club is reversible, in the sense that it may be used equally well by either a right or left handed person.

The actual form and structure of the implement may vary widely, and in Figs. 4 to 6, inclusive, I have illustrated an implement made in accordance with my invention and entirely efficient in its intended function, which may be manufactured at an extremely low cost. The head portion 11 of the device in this instance consists of a strip of sheet steel of proper gage, this strip being of the concavo-convex form previously set forth and as shown in Fig. 6. In forming this head, a simple elongated blank of the concavo-convex form may be employed, the hosel portion 12 of the head being pressed up and formed in a suitable die. It has been found that in producing the hosel 12, the concavo-convex steel blank will bend more or less naturally along the lines indicated by the reference numeral 16. A simple wooden shaft 13 may be inserted in the hosel and secured in place by rivets. The weight 14, which may be either straight as illustrated or curved in accordance with the curve of the head, may consist of hard lead composition which may be applied to the end of the steel strip by a molding or casting operation, it being preferable, as illustrated, to provide the extreme end of the steel strip with apertures through which the lead may pass to firmly affix the weight 14 to the body strip.

The use of spring steel with the concavo-convex form set forth has several material advantages. Not only is the head made somewhat resilient and capable of withstanding quite heavy shocks, but the edges may be readily given a cutting edge which will remain sharp for considerable periods. With the concavo-convex section a relatively light gage steel may be used with assurance of ample stiffness for any normal purpose. This section tends to retain its form under heavy strain, but flexes with relative freedom when the strain reaches the critical point. The concavo-convex form also permits the head to bend or flex toward the concaved face considerably more readily than in the opposite direction, this condition being ideal, in that it permits the head to bend before rupturing under abnormal strains placed upon it through the shaft, as might occur if someone were to lean his weight against the top of the shaft. Damage or rupture of the head is thus prevented, while the resistance to bending in either direction insures maintenance of the head in its proper form and position under all normal conditions.

In Fig. 7, I have illustrated still another form of the device wherein a concavo-convex spring steel strip is died into desired form, with the hosel portion 17 which receives the shaft 18 formed to embrace the shaft from the rear side instead of from the front side, as in the case of the embodiment shown in Fig. 4. In all other respects, the device may be the same as that previously described.

In Fig. 8, a simple concavo-convex strip 21, preferably of spring steel, is used having the weight 22 secured at one extremity, and having riveted or otherwise secured at the other extremity a hosel element 23. By this means, the necessity for using complicated and expensive forming dies is avoided.

The embodiment shown in Figs. 9, 10 and 11 utilizes as the cutting blade a steel strip 26 which is secured to the concaved upper face of a forged or otherwise formed head 27 by means in the present instance of rivets 28. The strip 26 thus takes the desired concavo-convex form. In this instance, the head 27 includes as integral parts both the hosel 29 and the weight 30.

As a weed-cutting or grass-trimming implement, the device will be found highly efficient, and by reason of its relation to the very popular game of golf, its use affords a degree of entertainment which largely overbalances the sense of labor being performed. So attractive is the implement and its use so intriguing that in many cases it will be possible for an owner of the implement to have the weeds trimmed from his lawn both free of charge and with no effort on his own part. His neighbors seeing him swinging the implement will be curious and when permitted to try the device will be so intrigued as to continue swinging the implement at the available weeds in sight until, before he is aware of it, he has entirely disposed of the weed crop to the benefit of his neighbor.

There may be further modifications without departure from the invention.

I claim:

1. A cutting tool of the stated character comprising a handle element and an elongated blade of resilient sheet metal extending at an angle from the lower end of said handle, the outer end of said blade being free and unsupported, and said blade having throughout its unsupported length and over its full width a transverse cross section of concavo-convex form with upturned side edges affording a substantial longitudinal and transverse rigidity against normal stresses, but said blade being capable of substantial flexure in the transverse direction without fracture or permanent distortion under excessive strain of an abnormal nature.

2. A cutting tool of the stated character comprising a shaft and an elongated blade of resilient sheet metal extending at an angle from the lower end of said shaft, the outer end of said blade being free and unsupported, and said blade having throughout its unsupported length a transverse cross section of concavo-convex form with upturned side edges affording a substantial longitudinal and transverse rigidity against normal stresses, but said blade being capable of flexure in the transverse direction without fracture or permanent distortion under excessive strain of an abnormal nature, and a weight element at the free end of said blade, the mass of said element being sufficient to create an inertia substantially overcoming the tendency of the free end of the blade to lag during the cutting operations.

EDDY R. WHITNEY.